US 6,729,544 B2

(12) United States Patent
Navon (10) Patent No.: US 6,729,544 B2
(45) Date of Patent: May 4, 2004

(54) FAST BARCODE SEARCH (75) Inventor: Yaakov Navon, Ein Vered (IL)

(73) Assignee: International Business Machines Corporation, Armonk, NY (US)

(*) Notice: Subject to any disclaimer, the term of this patent is extended or adjusted under 35 U.S.C. 154(b) by 241 days.

(21) Appl. No.: 09/847,484

(22) Filed: May 2, 2001

(65) Prior Publication Data

US 2002/0162889 A1 Nov. 7, 2002

(51) Int. Cl.[7] .................................................. G06K 7/10
(52) U.S. Cl. ........................... 235/462.14; 235/462.01; 235/462.1; 382/101; 382/276; 209/584; 209/900
(58) Field of Search .......... 235/462.01, 462.08–462.14; 382/101, 276; 209/584, 900

(56) References Cited

U.S. PATENT DOCUMENTS

| 5,296,690 A | * | 3/1994 | Chandler et al. | ......... 235/462.1 |
| 5,304,787 A | | 4/1994 | Wang | .......................... 235/462 |
| 5,504,319 A | * | 4/1996 | Li et al. | ................. 235/462.08 |
| 5,737,438 A | * | 4/1998 | Zlotnick et al. | ............ 382/101 |
| 6,047,893 A | * | 4/2000 | Saporetti | .................. 235/462.1 |
| 6,490,376 B1 | * | 12/2002 | Au et al. | ..................... 382/290 |

* cited by examiner

Primary Examiner—Diane I. Lee
Assistant Examiner—Seung H Lee
(74) Attorney, Agent, or Firm—Darby & Darby; Peter Ludwig (57) ABSTRACT A method for locating a barcode in an image includes dividing the image into a plurality of tiles, and scanning each of the tiles so as to detect a pattern of stripes associated with the barcode in at least one of the tiles. The pattern of stripes is analyzed so as to determine an angle of orientation of the barcode. Responsive to the determined angle, bounds of the barcode are defined in alignment with the pattern of the stripes.

39 Claims, 9 Drawing Sheets

FAST BARCODE SEARCH

FIELD OF THE INVENTION

The present invention relates generally to automated image processing and sorting, and specifically to automatic location of barcodes on material being sorted.

BACKGROUND OF THE INVENTION

Postal services and package delivery companies typically handle as many as several million parcels each being used increasingly in order to improve the efficiency and accuracy with which this huge volume of parcels is handled.

The process of sorting and tracking parcels as they proceed through sorting centers requires that each parcel bear two types of information: the destination address of the parcel and a tracking number, which uniquely distinguishes it from other parcels in the system. The information is generally printed on a parcel label, with the destination address in alphanumeric form. The tracking number, and frequently the address, as well, are printed in a machine-readable form, typically as a barcode. While the destination address tells where the parcel is to go, the tracking number assists the postal service or parcel company in managing its shipment operations and enables it to track parcels as they move through the system.

In order to sort and route the parcels automatically, the destination address and tracking number are typically read by a high-resolution imaging system. An image processor must then rapidly locate and read the barcode and the destination address on the parcel. This task is complicated by the fact that parcels vary greatly in size and shape, and may be placed on a conveyor belt for sorting in substantially any orientation. Furthermore, it frequently occurs that barcodes are located close to text and other graphic elements, as well as to tape or other shiny plastic items on the parcel, all of which add substantial "noise" to the barcode search. There is therefore a need for robust, high-speed methods that are capable of finding barcodes in a very large, noisy image within the tight time constraints of a large-volume package sorting system.

An exemplary method for locating barcodes, particularly two-dimensional barcodes, is described by Wang in U.S. Pat. No. 5,304,787, which is incorporated herein by reference. A stored image is processed to identify traversal of barcode start and stop patterns and to correlate these patterns with a common barcode image. The correlated patterns are used to identify a nominally rectangular area bounding the barcode in the image. The corners of the bounding area are used to identify the barcode for subsequent decoding.

SUMMARY OF THE INVENTION

Preferred embodiments of the present invention provide improved methods and systems for rapidly locating barcodes and other striped structures in a large and/or noisy image. For this purpose, the image (or a region of interest within the image) is divided up into tiles. Each tile is scanned along one or more parallel lines in order to detect patterns of parallel stripes that could be indicative of the presence of a barcode in the tile. Preferably, each tile is also scanned at a diagonal to the original scan direction, in order to detect patterns of stripes that are parallel or perpendicular to the original scan direction and might otherwise be missed. Tiles that are found to contain a sufficient number of mutually-parallel stripes are tagged as likely locations for a barcode. The angle of the stripes in these tiles provides an estimate of the orientation of the barcode.

Using this method, the entire image can be scanned quickly to identify all of the candidate barcode locations, without the need for an exhaustive search over all pixels and all possible stripe angles. The identification is largely insensitive to the barcode orientation angles and to the presence of noise and clutter in the vicinity of the barcodes. Based on these candidate locations and the associated orientation estimates, a precise orientation angle is determined for each barcode in the image. This angle is used to construct an exact rectangle that bounds the outline of the barcode. The barcode can then be read reliable, as well as serving as a "landmark" for finding other image features of importance.

Embodiments of the present invention are particularly advantageous in the context of automated mail processing. A parcel sorting system that uses automatic barcode identification for recognizing and processing parcel labels is described, for example, in U.S. patent application Ser. No. 09/567,700, which is assigned to the assignee of the present patent application and is incorporated herein by reference. The principles of the present invention will also be found useful, however, in other applications in which barcodes or other striped structures must be identified in digital images, and particularly in large, noisy images.

There is therefore provided, in accordance with a preferred embodiment of the present invention, a method for locating a barcode in an image, including:

dividing the image into a plurality of tiles;

scanning each of the tiles so as to detect a pattern of stripes associated with the barcode in at least one of the tiles;

analyzing the pattern of stripes so as to determine an angle of orientation of the barcode; and responsive to the determined angle, defining bounds of the barcode that are aligned with the pattern of the stripes.

Preferably, scanning each of the tiles includes scanning so as to detect the pattern of stripes substantially irrespective the angle of orientation of the barcode. Most preferably, scanning each of the tiles includes scanning on a first line through the tile in a first scan direction so as to detect the stripes in the tile that are crossed by the first line, and scanning on a second line through the tile in a second scan direction, at a diagonal to the first direction, so as to detect the stripes in the tile that are crossed by the second line.

Preferably, scanning each of the tiles includes detecting the pattern of stripes in a first one of the tiles, and defining the bounds of the barcode includes seeking the bounds of the barcode in at least a second one of the tiles, adjacent to the first one of the tiles.

Additionally or alternatively, the stripes have respective ends, and defining the bounds of the barcode includes locating the ends of the stripes and delimiting a rectangle containing the barcode and having sides defined by the ends of the stripes. Preferably, defining the bounds of the barcode includes finding extreme lines of the barcode corresponding to first and last ones of the stripes of the barcode, and locating the ends of the stripes includes scanning along at least some of the stripes intermediate the first and last stripes in a direction parallel to the extreme lines.

Preferably, the method includes reading the barcode responsive to the bounds.

There is also provided, in accordance with a preferred embodiment of the present invention, a method for finding a pattern of parallel stripes in an image, which includes a plurality of pixels having respective pixel values, the method including:

scanning an area of the image along a selected scan line in a first scan direction so as to locate a first sequence of the pixels on the line having pixel values within a predetermined range;

starting from each of at least some of the pixels in the sequence, scanning in a second scan direction, transverse to the first scan direction, to both sides of the line, so as to reach endpoint pixels defined by the first of the pixels on both sides of the line having pixel values outside the predetermined range;

joining the endpoint pixels on each side of the line to define respective edges of a first one of the stripes;

repeating the steps of scanning the area in the first and second scan directions and of joining the endpoint pixels for at least a second sequence of the pixels on the line having pixel values within the predetermined range, so as to define the respective edges of at least a second one of the stripes; and comparing the edges of at least the first and second striped to find the stripe pattern in the image.

Preferably, the method includes scanning the area along a further scan line, in a direction diagonal to the first scan direction, so as to locate third and fourth sequences of the pixels on the further scan line having pixel values within the predetermined range, and repeating the steps of scanning in the second direction, joining the endpoint pixels and comparing the edges with respect to the third and fourth sequences of the pixels and the diagonal direction.

Further preferably, comparing the edges includes determining an orientation of the stripes in the pattern. Most preferably, comparing the edges includes identifying the stripes as belonging to the stripe pattern only if the edges are mutually parallel to within a predetermined limit.

In a preferred embodiment, the pattern includes a barcode.

There is additionally provided, in accordance with a preferred embodiment of the present invention, apparatus for locating a barcode in an image, including an image processor, which is arranged to divide the image into a plurality of tiles, to scan each of the tiles so as to detect a pattern of stripes associated with the barcode in at least one of the tiles, to analyze the pattern of striped so as to determine an angles of orientation of the barcode, and responsive to the determined angle, to define bounds of the barcode that are aligned with the pattern of the stripes.

In a preferred embodiment, the apparatus includes an image capture device, which is arranged to capture the image of an object on which the barcode appears. Preferably, the image processor is arranged to read the barcode responsive to the bounds so as to extract information contained in the barcode, and the apparatus includes a sorter, which is arranged to sort the object responsive to the information.

There is further provided, in accordance with a preferred embodiment of the present invention, apparatus for finding a pattern of parallel stripes in an image, which includes a plurality of pixels having respective pixels values, the apparatus including an image processor, which is arranged to scan an area of the image along a selected scan line in a first scan direction so as to locate a first sequence of the pixels on the line having pixel values within a predetermined range, and starting from each of at least some of the pixels in the sequence, to scan in a second scan direction, transverse to the first scan direction, to both sides of the line, so as to reach endpoint pixels defined by the first of the pixels on both sides of the line having pixel values outside the predetermined range, to join the endpoint pixels on each side of the line to define respective edges of a first one of the stripes, and to repeat the steps of scanning the area in the first and second scan directions and of joining the endpoint pixels for at least a second sequence of the pixels on the line having pixel values within the predetermined range, so as to define the respective edges of at least a second one of the stripes, and to compare the edges of at least the first and second stripes to find the stripe pattern in the image.

There is moreover provided, in accordance with a preferred embodiment of the present invention, a computer software product for locating a barcode in an image, including a computer-readable medium in which program instructions are stored, which instructions, when read by a computer, cause the computer to divide the image into a plurality of tiles, to scan each of the tiles so as to detect a pattern of stripes associated with the barcode in at least one of the tiles, to analyze the pattern of stripes so as to determine an angle of orientation of the barcode, and responsive to the determined angle, to define bounds of the barcode that are aligned with the pattern of the stripes.

There is furthermore provided, in accordance with a preferred embodiment of the present invention, a computer software product for finding a pattern of parallel stripes in an image, which includes a plurality of pixels having respective pixel values, the product including a computer-readable medium in which program instructions are stored, which instructions, when read by a computer, cause the computer to scan an area of the image along a selected scan line in a first scan direction so as to locate a first sequence of the pixels on the line having pixel values within a predetermined range, and starting from each of at least some of the pixels in the sequence, to scan in a second scan direction, transverse to the first scan direction, to both sides of the line, so as to reach endpoint pixels defined by the first of the pixels on both sides of the line having pixel values outside the predetermined range, to join the endpoint pixels on each side of the line to define respective edges of a first one of the stripes, and to repeat the steps of scanning the area in the first and second scan directions and of joining the endpoint pixels for at least a second sequence of the pixels on the line having pixel vales within the predetermined range, so as to define the respective edges of at least a second one of the stripes, and to compare the edges of at least the first and second stripes to find the stripe pattern in the image.

The present invention will be more fully understood from the following detailed description of the preferred embodiments thereof, taken together with the drawings in which:

DETAILED DESCRIPTION OF PREFERRED EMBODIMENTS

Figure 1:
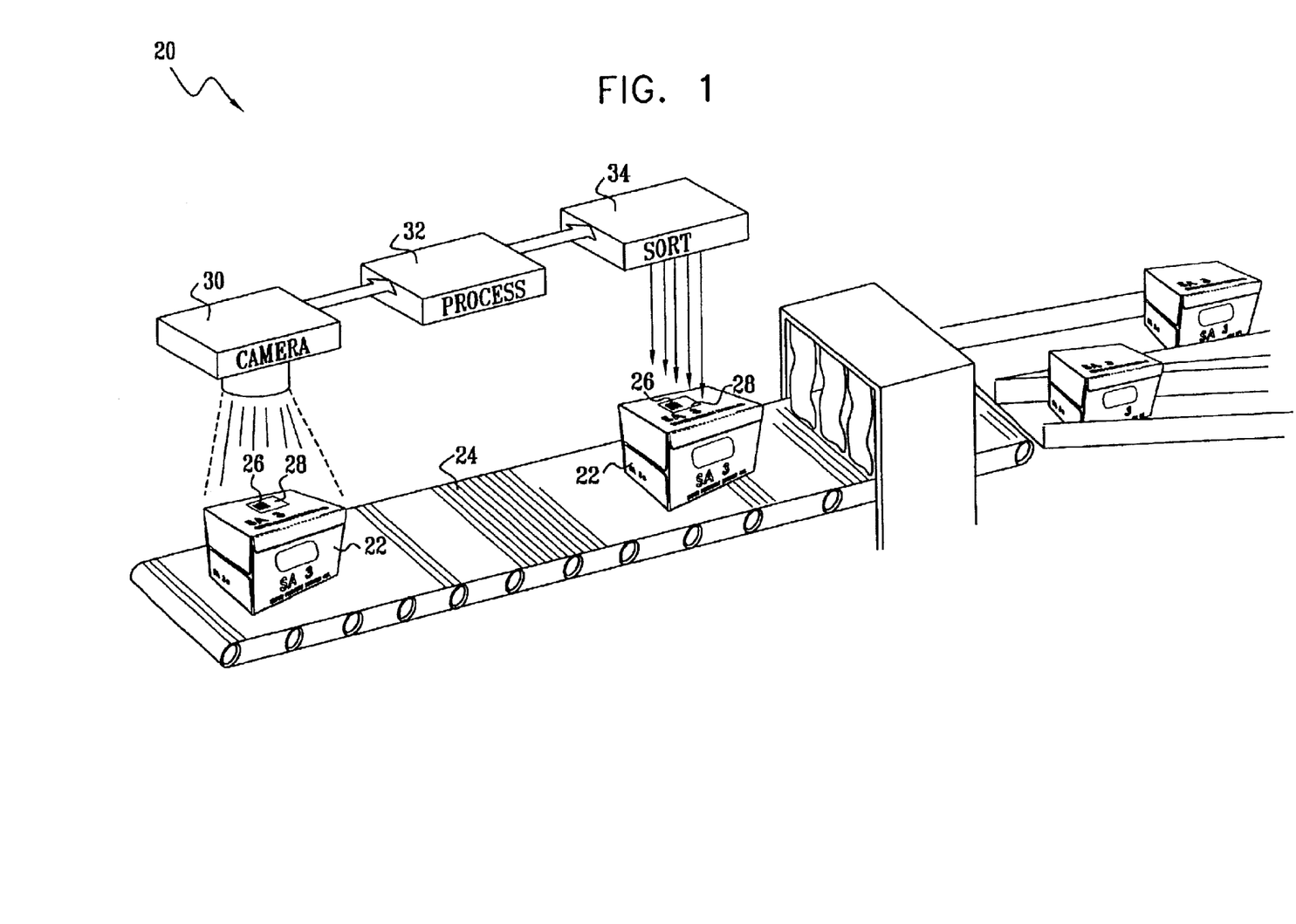
FIG. 1 is a schematic, partly pictorial illustration of a system for sorting parcels, in accordance with a preferred embodiment of the present invention.

FIG. 1 is a schematic, pictorial illustration of a system 20 for parcel sorting, in accordance with a preferred embodiment of the present invention. A parcel 22 is transported by a conveyor 24. The parcel has a label 26, which typically contains a barcode 28. An image of the parcel, preferably a gray-scale image, is captured by an imaging device 30, preferably a line scan camera operating in a "push-broom" mode. The image captured by the camera is digitized and passed to a processor 32, which applies the methods described hereinbelow to locate barcode 28 on the parcel. Alternatively, the processor may receive the image from some other source, or it may retrieve the image from a memory (not shown). Typically, after locating the barcode, the processor reads the barcode and address on label 26 automatically and drives a sorter 34 to route the parcel accordingly.

Processor 32 preferably comprises a general-purpose computer, programmed with appropriate software to carry out the methods of the present invention. This software may be downloaded to the processor in electronic form, over a network, for example, or alternatively, it may be supplied on tangible media, such as CD-ROM, for installation in the processor. Such software may similarly be adapted for use in other image processing applications, and may thus be supplied to and installed on other computers in like manner. Alternatively, the methods described herein may be implemented using dedicated hardware or a programmable digital signal processor, or using a combination of dedicated and/or programmable elements and/or software. The use of processor 32 in the context of parcel sorting system 20 is described here by way of example, and not limitation.

Figure 2:
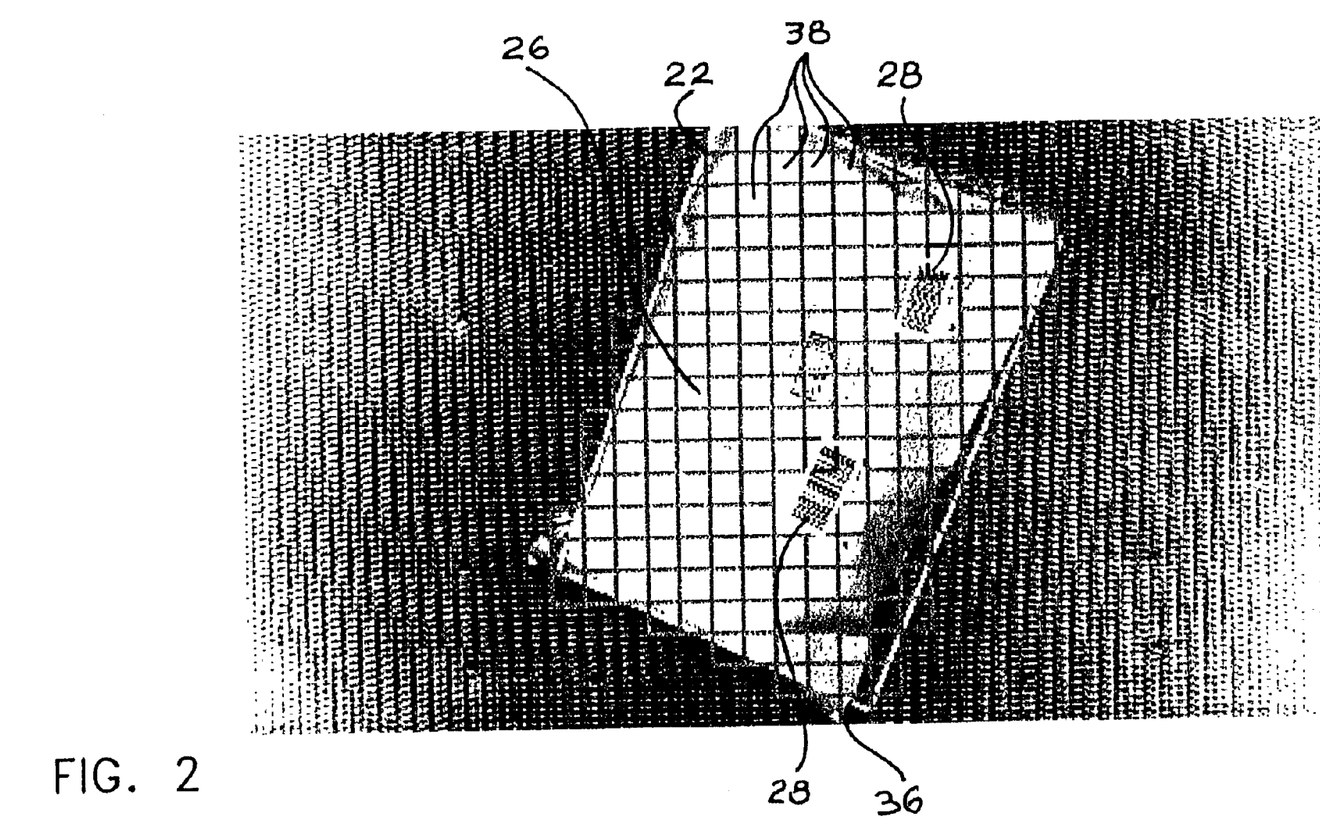
FIG. 2 is a schematic representation of an image capture and divided into tiles for processing in the system of FIG. 1, in accordance with a preferred embodiment of the present invention.

FIG. 2 is a schematic representation of an image of parcel 22 captured by imaging device 30 and processed by processor 32, in accordance with a preferred embodiment of the present invention. This image contains two barcodes 28, as is typical on many of the parcels encountered by parcel sorting systems. In order to process the image, processor 32 identifies a region of interest (ROI) 36, corresponding roughly to the area of parcel 22, as distinguished from conveyor 24 on which the parcel is resting. The ROI is divided up into tiles 38 for further processing, wherein each of the tiles is preferably about 150×150 pixels in size.

Figure 3:
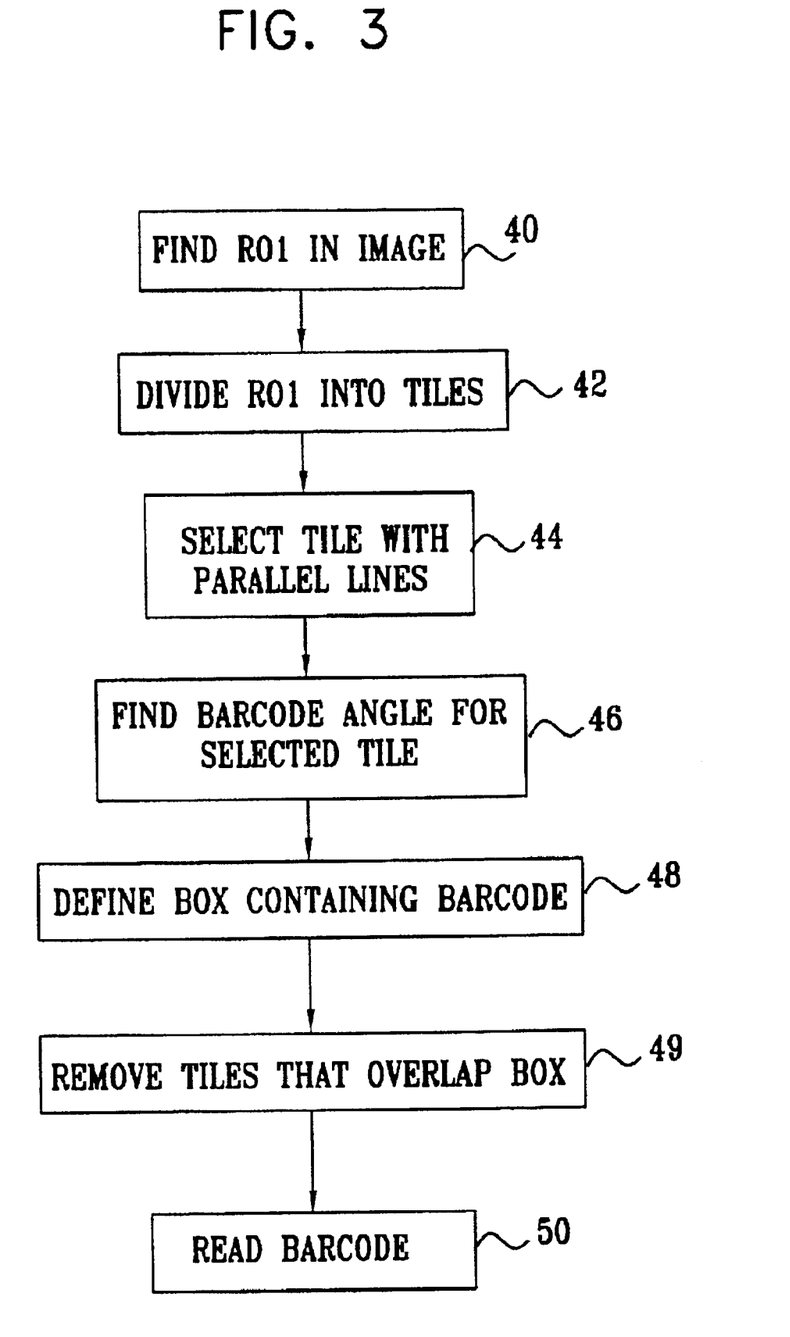
FIG. 3 is a flow chart that schematically illustrates a method for locating a barcode in an image, in accordance with a preferred embodiment of the present invention.

FIG. 3 is a flow chart that schematically illustrates a method for processing images such as that shown in FIG. 2 so as to find barcodes 28 in the image, in accordance with a preferred embodiment of the present invention. As noted above, processor 32 preferably finds ROI 36, at an ROI definition step 40. Alternatively, the method of FIG. 3 may be applied to the entire image and not limited to a certain ROI. The ROI is divided into tiles of appropriate size, at a tiling step 42. The processor checks each of the tiles rapidly, at a tile selection step 44, to determine which of the tiles are likely to contain all or part of a barcode. Step 44 is based on locating parallel lines, or stripes, in the tile. This step is described in greater detail hereinbelow with reference to FIGS. 4A, 4B and 5. Preferably, a tile is considered to contain a barcode (or part of one) if at least five such stripes are found in the tile, and most of the stripes are mutually parallel to with about 1°.

The orientation of the stripes that are found in a candidate tile provides an initial estimate of the orientation of the actual barcode. Processor 32 uses this estimate as a basis for determining the precise orientation angle of the barcode, at an angle calculation step 46. For the purpose of this step, the tile area is preferably binarized. Following binarization, the black pixels in the tile, which presumably belong to the barcode, are sampled, and lines are fitted through the sampled points at angles that are close to the estimated barcode orientation angle. The precise orientation angles of the stripes are then calculated using methods known in the art, such as Hough transforms.

In order to accurately decode and use all of the information provided by barcode 28, it is important to define the bounds of the barcode precisely. For this purpose, processor 32 outlines a rectangular box containing the barcode, at a box definition step 48. This step is described in detail hereinbelow with reference to FIGS. 6A, 6B and 7. If necessary, when the barcode extends from one tile into the next, the parts of the barcode in the neighboring tiles are found, and the box is extended accordingly. In this case, the processor preferably eliminates the neighboring tile or tiles from any further search, at a removal step 49, since the barcode in these tiles has already been found.

After defining the bounding box of the barcode, the processor reads the barcode contents, at a reading step 50. Additionally or alternatively, the barcode location and geometry are used in identifying and analyzing other features in the image of parcel 22, and particularly of label 26, as described, for example, in the above-mentioned U.S. patent application Ser. No. 09/567,700.

Figure 4A:
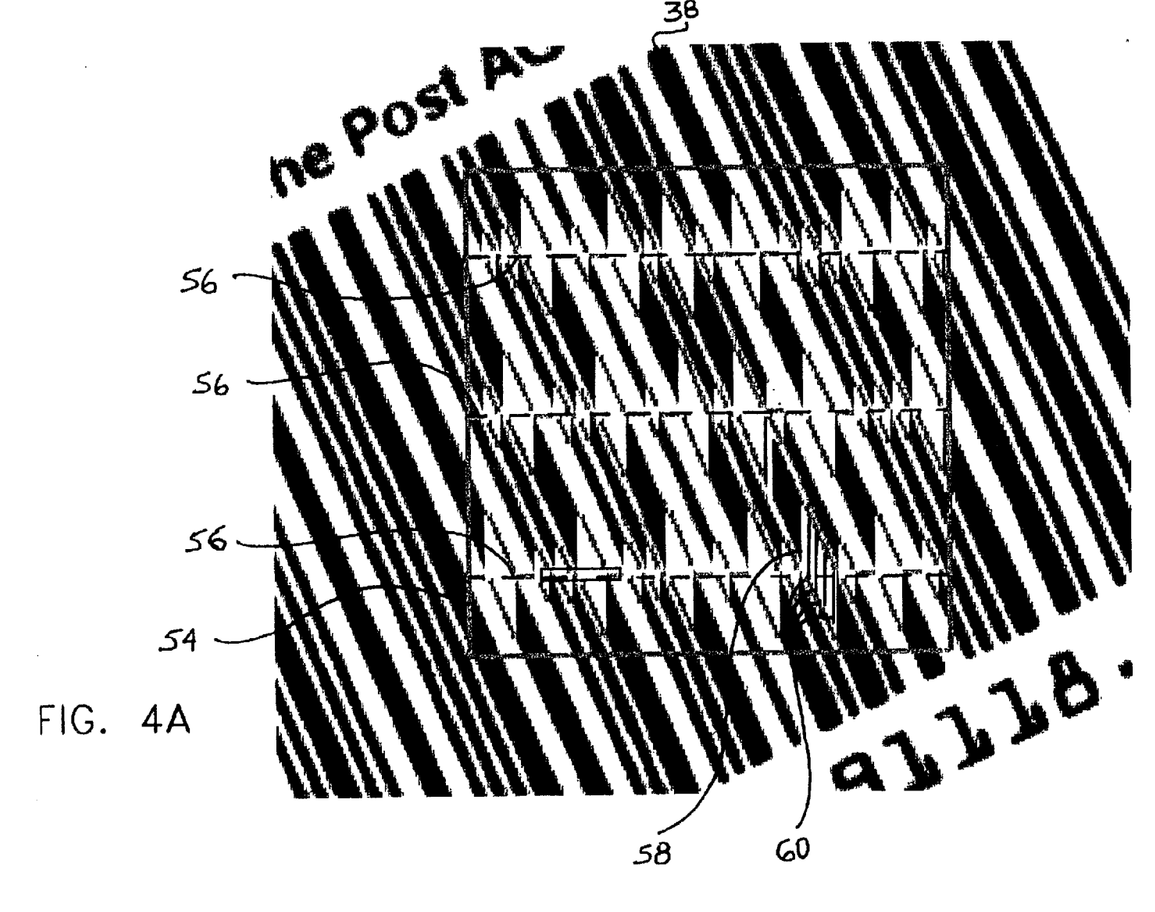
FIGS. 4A and 4B are schematic representations of a tile within an image of a parcel, showing details of a barcode in the tile, which is processed in accordance with a preferred embodiment of the present invention.
Figure 4B:
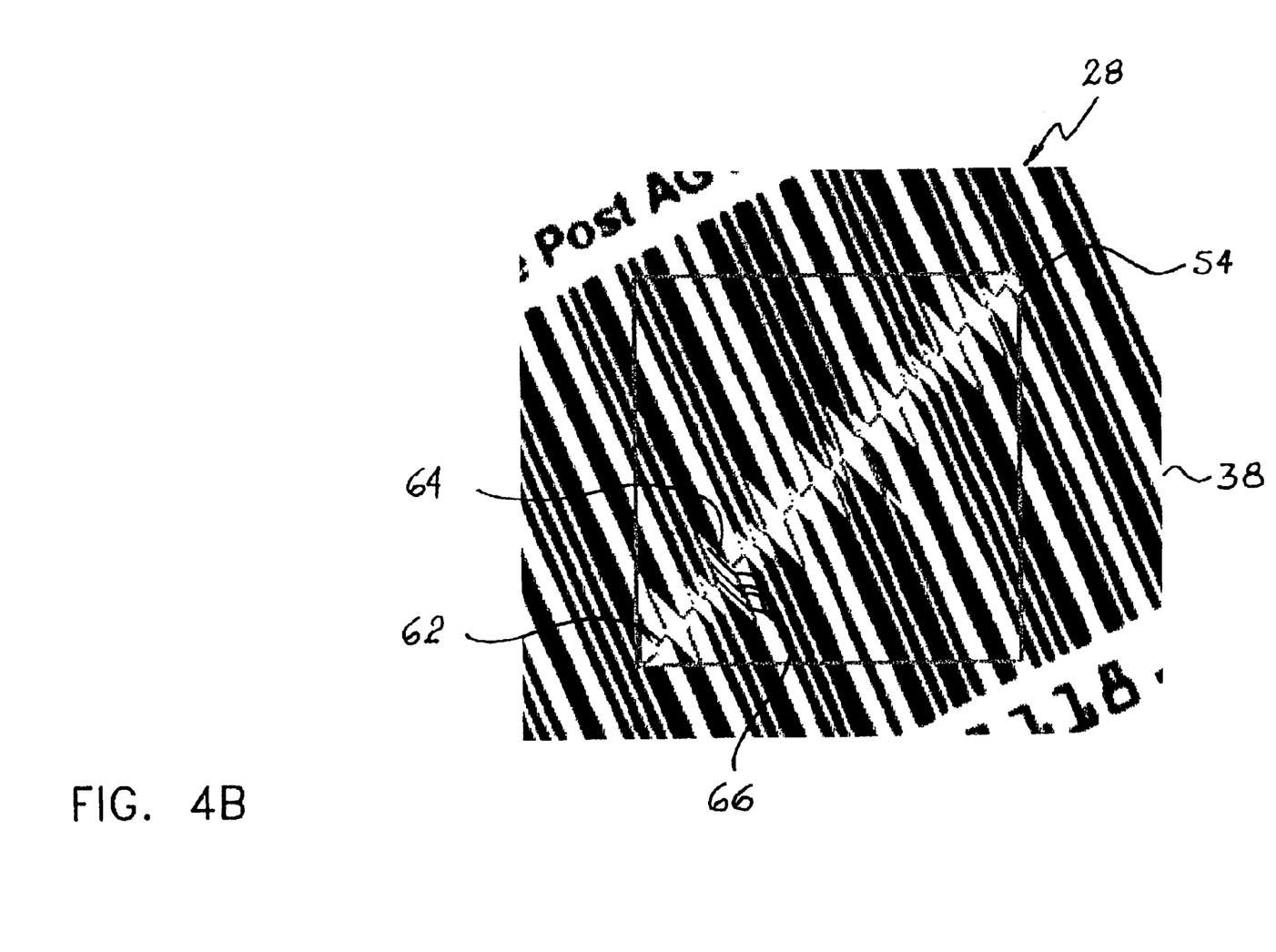
Figure 5:
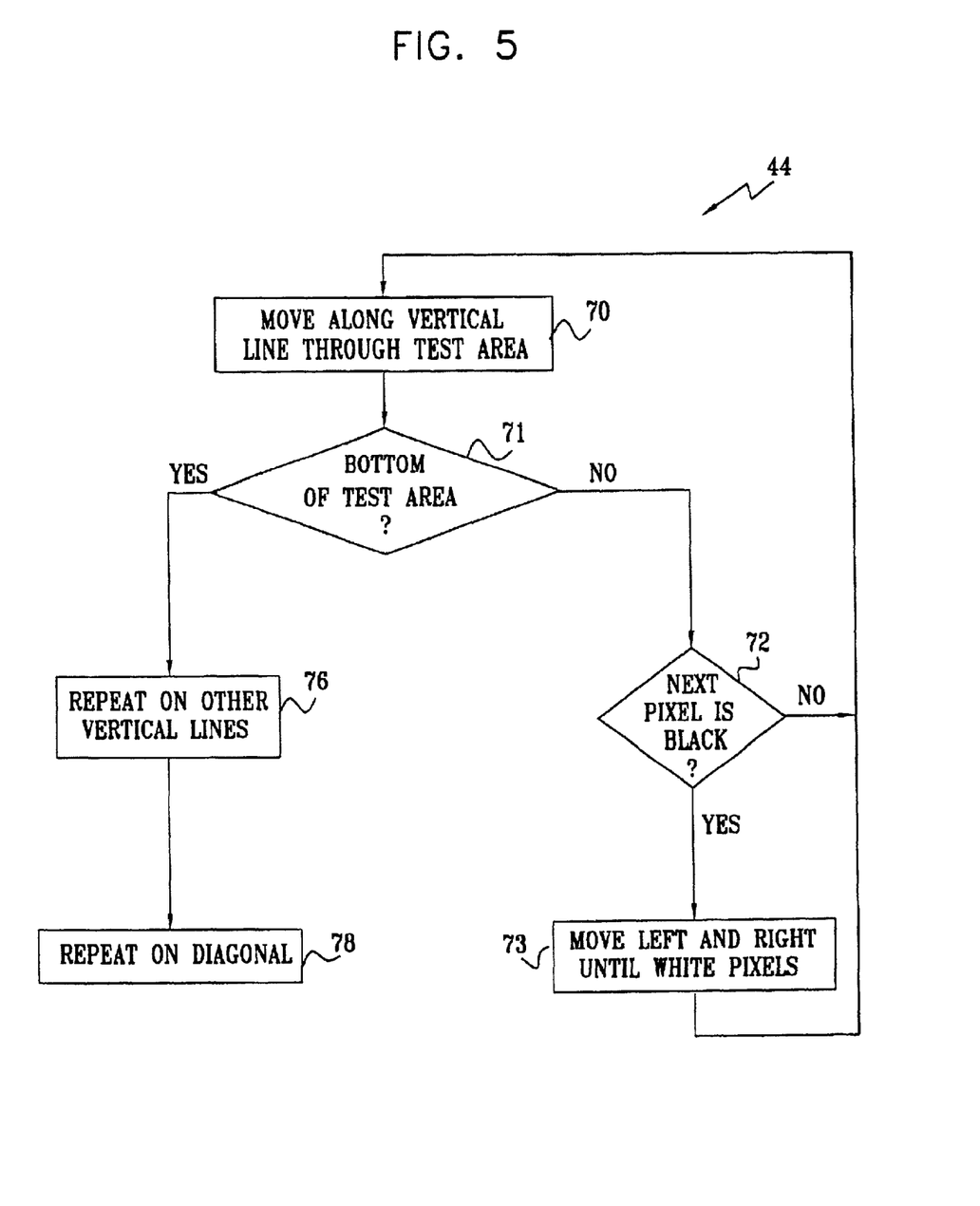
FIG. 5 is a flow chart that schematically illustrates a method for detecting parts of a barcode in an image, in accordance with a preferred embodiment of the present invention.

Reference is now made to FIGS. 4A, 4B and 5 in order to describe details of tile selection step 44, in accordance with a preferred embodiment of the present invention. FIGS. 4A and 4B are schematic representations of an image of one of tiles 38, in which a part of barcode 28 is located. FIG. 5 is a flow chart that illustrates a method for rapidly scanning tile 38 to determine whether it contains parallel stripes that would qualify it as a candidate to contain the barcode.

In FIG. 4A, three parallel vertical scan lines 56 are defined, covering a test area 54 within tile 38. Alternatively, a greater or lesser number of the scan lines may be defined, and test area 54 may also be expanded to cover all of tile 38. Further alternatively or additionally, horizontal scan lines may be used for this purpose. At a vertical scanning step 70 (FIG. 5), processor 32 scans down a first one of scan lines 56 until it reaches the bottom of the test area, at a vertical scan completion step 71. When the processor encounters a black pixel, at a black pixel step 72, it then scans transversely, to the left and right, at a transverse scanning step 73. The transverse scan is terminated when a white pixel is encountered on each side of the scan line. Typical transverse scan lines 58 generated at step 73 are shown in FIG. 4A.

The ends of each line 58 are marked as endpoints 60. It will be observed that for each black stripe of the barcode that is traversed by vertical scan line 56, the two sets of endpoints at either side of line 56 define two line segments that run along the opposing parallel edges of the stripe. In FIG. 4A, only the endpoints of the transverse scan lines are marked, while for simplicity of illustration, the area between the endpoints is left blank (except in one of the scanned areas in which lines 58 are drawn). Thus, processor 32 locates stripes of the barcode by finding two opposing sets of endpoints 60 that define line segments that are parallel to within a predetermined limit, typically 1–2°. The orientation of the stripe is given approximately by the slopes of the line segments. As noted above, if a sufficient number of these stripes are found in a given tile, and the stripe are mutually correlated in their orientation angles, the processor determines that it has found a barcode.

After scanning the first of vertical scan lines 56 in this manner, processor 32 preferably repeats the scan procedure along additional scan lines in order to ensure that it has not missed a barcode in the tile. First, the processor goes on to scan the other vertical scan lines 56 in substantially the same manner as it scanned the first line, at a vertical scan repetition step 76. Most preferably, the processor also performs at least one scan along a diagonal scan line 62 (FIG. 4B), at a diagonal scanning step 78. As in the vertical scan, stripes of bar code 28 are found by scanning on diagonal transverse scan lines 64, in order to find diagonal endpoints 66. The diagonal scan is important in cases in which the stripes of the barcode are parallel to or perpendicular to vertical scan lines 56. If not for the diagonal scan, the processor might fail to identify the barcode in such a case.

Figure 6A:
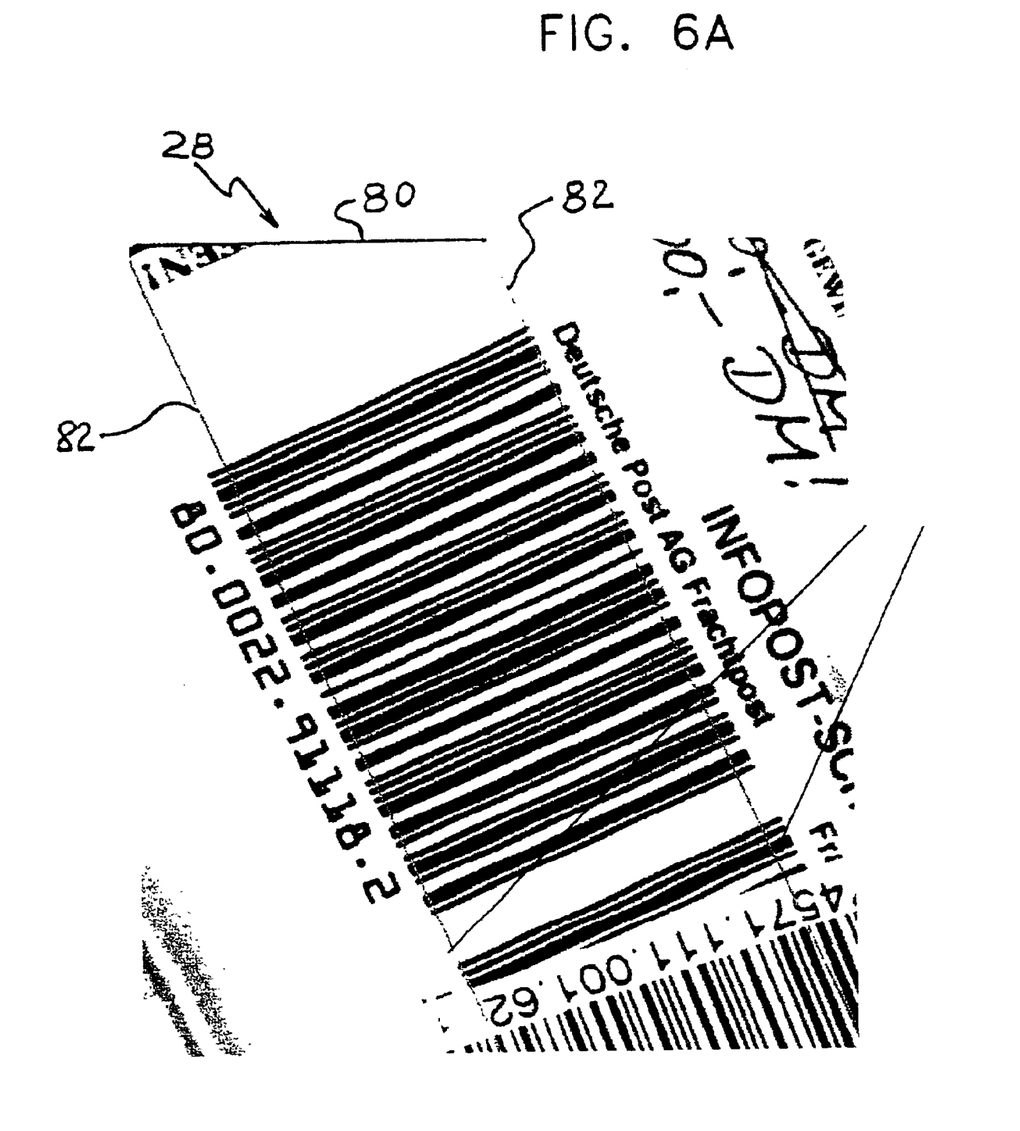
FIGS. 6A and 6B are schematic representations of a portion of an image of a parcel, illustrating construction of a rectangle bounding a barcode in the image, in accordance with a preferred embodiment of the present invention.
Figure 6B:
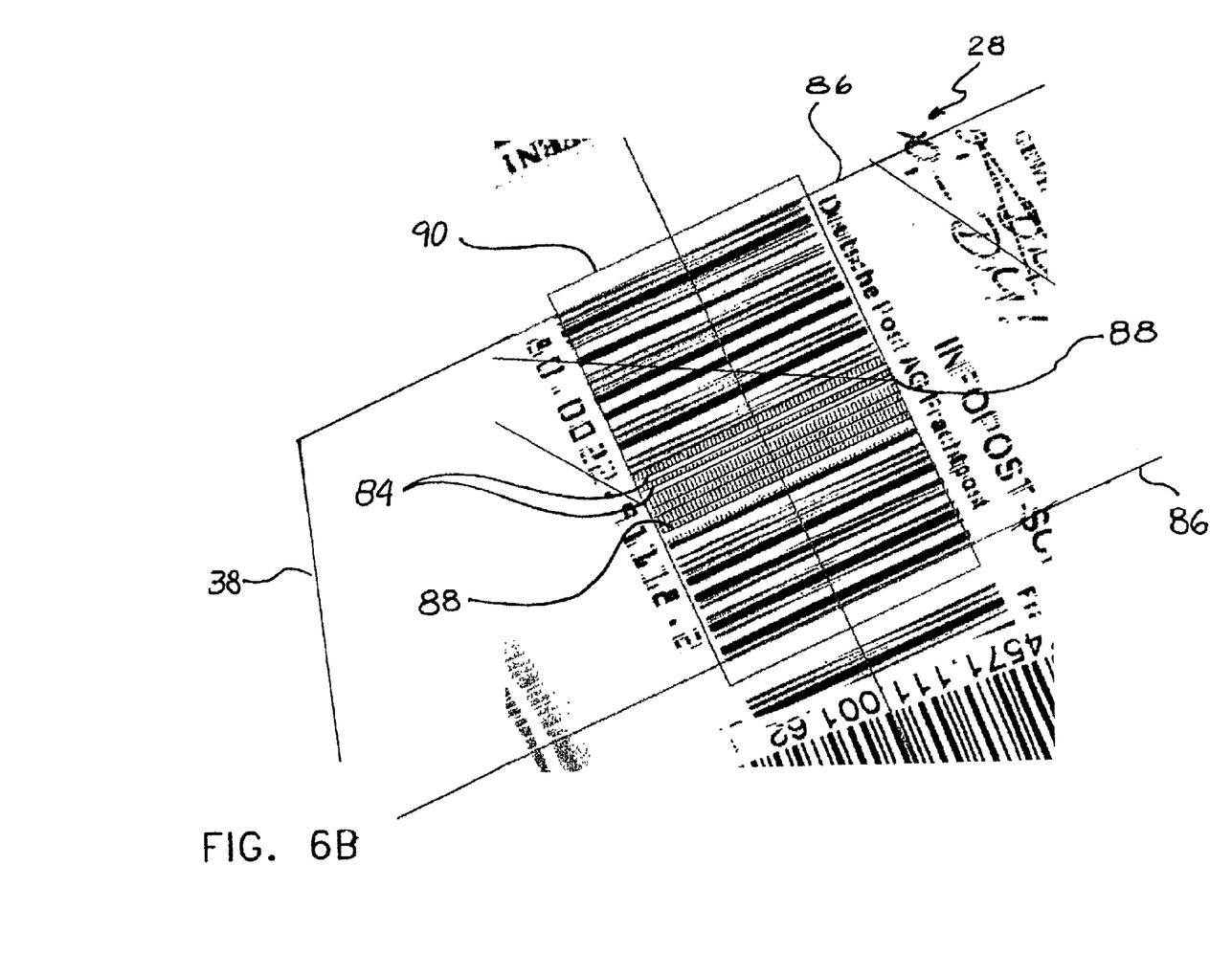
Figure 7:
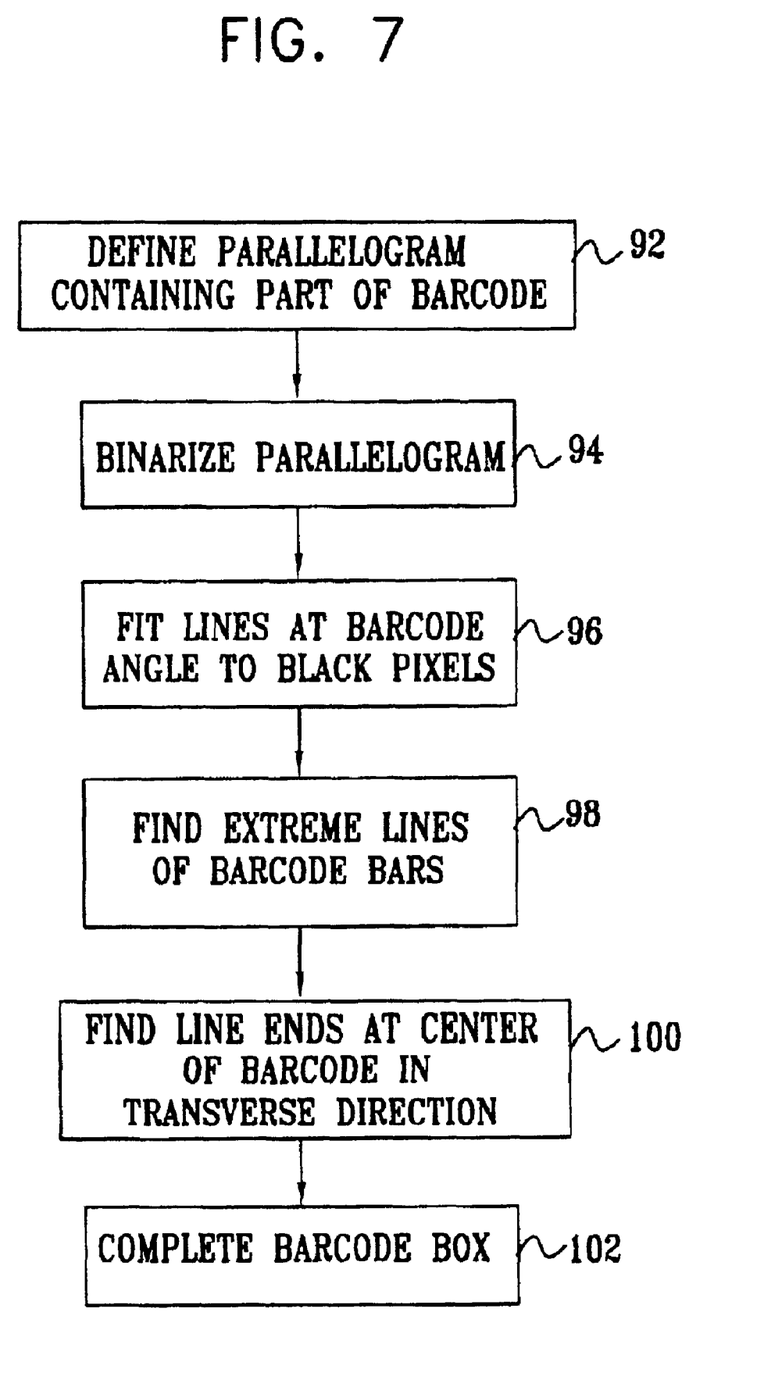
FIG. 7 is a flow chart that schematically illustrates a method for constructing a rectangle that bounds a barcode in an image, in accordance with a preferred embodiment of the present invention.

Reference is now made to FIGS. 6A, 6B and 7 in order to describe details of box definition step 48, in accordance with a preferred embodiment of the present invention. FIGS. 6A and 6B are schematic representatives of an area of the image of parcel 22 containing barcode 28. This area has been expanded, relative to the area of tile 38 shown in FIGS. 4A and 4B, by adding the neighboring tiles so as to take in all of the barcode in question. FIG. 7 is a flow chart that schematically illustrates a method for determining the outline of a box 90 (FIG. 6B) that completely contains the barcode.

Using the barcode angle for tile 38 that was found at step 46 (FIG. 3), processor 32 defines a parallelogram 80 (FIG. 6A) in which barcode 28 can be located, at a parallelogram definition step 92 (FIG. 7). The parallelogram is preferably centered in the tile in which the barcode was identified, but it is expanded to include parts of the neighboring tiles. Sides 82 of the parallelogram are chosen to run at the determined axial angle of barcode 28 (i.e., perpendicular to the angle of the stripes), preferably near the edges of the barcode. As shown in FIG. 6A, sides 82 may still not be exactly aligned with the actual edges of the barcode, typically because of skew in the image that was originally captured by imaging device 30.

The image within parallelogram 80 is processed to find the precise bounds of the barcode. Preferably, the image is first binarized, at a binarization step 94. Lines 84 at the transverse angle of barcode 28 (perpendicular to sides 82) are fitted to the stripes of barcode 28 that fall within parallelogram 80, at a fitting step 96. The last line at either end of the barcode is identified as an extreme line 86 (FIG. 6B) of the barcode, at an extremity finding step 98. The extreme lines are easily identified, since beyond these lines there is a wide extent of white space before any further black features are encountered.

A subset of lines 84, preferably the lines that are fitted to the stripes near the center of barcode 28, are scanned transversely (in a direction parallel to extreme lines 86) to find the ends of these central lines, in a transverse scanning step 100. In this case, too, it is easy to find the ends of the lines, simply by noting the points at which white areas of the image are encountered at either end of each line. The ends of these central lines define the exact loci of edges 88 of the barcode. These edges are used to define a complete box 90 containing the barcode, at a box completion step 102. The box is preferably extended slightly beyond extreme lines 86 in order to ensure that the information in the first and last stripes of the barcode is not lost when the barcode is read at step 50 (FIG. 3). It will be observed that box 90 contains only the barcode of interest, while excluding other nearby barcode fragments and text.

Although preferred embodiments are described hereinabove with reference certain specific methods for line fitting and angle determination, those skilled in the art will appreciate that other methods of image processing may also be used for these purposes. While the inventor has found that image binarization is useful in rapid processing of image data in certain of the processing phases described above, gray-scale and color image processing methods may also be used in alternative embodiments of the present invention. Moreover, although preferred embodiments of the present invention are directed to finding and processing barcodes on parcels and other objects, the principles of the present invention may similarly be applied to detecting and processing other patterns of parallel lines and stripes that may be encountered in automated image analysis, including patterns appearing in binary, gray-scale and color images. The term "barcode" as used in the context of the present patent application and in the claims should therefore be taken to refer to substantially any machine-readable code that comprises a pattern of contrasting stripes.

It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method for locating a barcode in an image, comprising:

dividing the image into a plurality of tiles;

scanning each of the tiles so as to detect a pattern of stripes associated with the barcode in at least one of the tiles;

analyzing the pattern of stripes so as to determine an angle of orientation of the barcode; and     responsive to the determined angle, defining bounds of the barcode that are aligned with the pattern of the stripes,     wherein scanning each of the tiles comprises scanning so as to detect the pattern of stripes substantially irrespective of the angle of orientation of the barcode, and     wherein scanning each of the tiles comprises scanning on a first line through the tile in a first scan direction so as to detect the stripes in the tile that are crossed by the first line, and scanning on a second line through the tile in a second scan direction, at a diagonal to the first direction, so as to detect the stripes in the tile that are crossed by the second line.

2. A method for locating a barcode in an image, comprising:

dividing the image into a plurality of tiles;

scanning each of the tiles so as to detect a pattern of stripes associated with the barcode in at least one of the tiles;

analyzing the pattern of stripes so as to determine an angle of orientation of the barcode; and responsive to the determined angle, defining bounds of the barcode that are aligned with the pattern of the stripes, wherein scanning each of the tiles comprises:

scanning the tile along a selected scan line in a first scan direction so as to locate a first sequence of pixels on the line having pixel values within a predetermined range;

starting from each of at least some of the pixels in the first sequence, scanning in a second scan direction, transverse to the first scan direction, to both sides of the scan line, so as to reach endpoint pixels defined by the first of the pixels on both sides of the line having pixel values outside the predetermined range; and joining the endpoint pixels on each side of the line so as to define respective edges of a first one of the stripes.

3. A method according to claim 2, and comprising:

repeating the steps of scanning the area in the first and second scan directions and of joining the endpoint pixels for at least a second sequence of the pixels on the line having pixel values within the predetermined range, so as to define the respective edges of at least a second one of the stripes; and comparing the edges of at least the first and second stripes to find the stripe pattern in the image.

4. A method for locating a barcode in an image, comprising:

dividing the image into a plurality of tiles;

scanning each of the tiles so as to detect a pattern of stripes associated with the barcode in at least one of the tiles;

analyzing the pattern of stripes so as to determine an angle of orientation of the barcode; and responsive to the determined angle, defining bounds of the barcode that are aligned with the pattern of the stripes, wherein scanning each of the tiles comprises detecting the pattern of stripes in a first one of the tiles, and wherein defining the bounds of the barcode comprises seeking the bounds of the barcode in at least a second one of the tiles, adjacent to the first one of the tiles.

5. A method according to claim 4, wherein scanning each of the tiles comprises scanning so as to detect the pattern of stripes substantially irrespective of the angle of orientation of the stripes.

6. A method according to claim 4, wherein the stripes have respective ends, and wherein defining the bounds of the barcode comprises locating the ends of the stripes and delimiting a rectangle containing the barcode and having sides defined by the ends of the stripes.

7. A method according to claim 4, and comprising reading the barcode responsive to the bounds.

8. A method for locating a barcode in an image, comprising:

dividing the image into a plurality of tiles;

scanning each of the tiles so as to detect a pattern of stripes associated with the barcode in at least one of the tiles;

analyzing the pattern of stripes so as to determine an angle of orientation of the barcode; and responsive to the determined angle, defining bounds of the barcode that are aligned with the pattern of the stripes, wherein the stripes have respective ends, and wherein defining the bounds of the barcode comprises locating the ends of the stripes and delimiting a rectangle containing the barcode and having sides defined by the ends of the stripes, wherein defining the bounds of the barcode comprises finding extreme lines of the barcode corresponding to first and last ones of the stripes of the barcode, and wherein locating the ends of the stripes comprises scanning along at least some of the stripes intermediate the first and last stripes in a direction parallel to the extreme lines.

9. A method for finding a pattern of parallel stripes in an image, which comprises a plurality of pixels having respective pixel values, the method comprising:

scanning an area of the image along a selected scan line in a first scan direction so as to locate a first sequence of the pixels on the line having pixel values within a predetermined range;

starting from each of at least some of the pixels in the sequence, scanning in a second scan direction, transverse to the first scan direction, to both sides of the line, so as to reach endpoint pixels defined by the first of the pixels on both sides of the line having pixel values outside the predetermined range;

joining the endpoint pixels on each side of the line to define respective edges of a first one of the stripes;

repeating the steps of scanning the area in the first and second scan directions and of joining the endpoint pixels for at least a second sequence of the pixels on the line having pixel values within the predetermined range, so as to define the respective edges of at least a second one of the stripes; and comparing the edges of at least the first and second stripes to find the stripe pattern in the image.

10. A method according to claim 9, and comprising scanning the area along a further scan line, in a direction diagonal to the first scan direction, so as to locate third and fourth sequences of the pixels on the further scan line having pixel values within the predetermined range, and repeating the steps of scanning in the second direction, joining the endpoint pixels and comparing the edges with respect to the third and fourth sequences of the pixels and the diagonal direction.

11. A method according to claim 9, wherein comparing the edges comprises determining an orientation of the stripes in the pattern.

12. A method according to claim 11, wherein comparing the edges comprises identifying the stripes as belonging to the stripe pattern only if the edges are mutually parallel to within a predetermined limit.

13. A method according to claim 9, wherein the pattern comprises a barcode.

14. Apparatus for locating a barcode in an image, comprising an image processor, which is arranged to divide the image into a plurality of tiles, to scan each of the tiles so as to detect a pattern of stripes associated with the barcode in at least one of the tiles, to analyze the pattern of stripes so as to determine an angle of orientation of the barcode, and responsive to the determined angle, to define bounds of the barcode that are aligned with the pattern of the stripes, wherein the processor is arranged to detect the pattern of stripes substantially irrespective of the angle of orientation of the barcode, and wherein the processor is arranged to scan each of the tiles on a first line through the tile in a first scan direction so as to detect the stripes in the tile that are crossed by the first line, and on a second line through the tile in a second scan direction, at a diagonal to the first direction, so as to detect the stripes in the tile that are crossed by the second line.

15. Apparatus for locating a barcode in an image, comprising an image processor, which is arranged to divide the image into a plurality of tiles, to scan each of the tiles so as to detect a pattern of stripes associated with the barcode in at least one of the tiles, to analyze the pattern of stripes so as to determine an angle of orientation of the barcode, and responsive to the determined angle, to define bounds of the barcode that are aligned with the pattern of the stripes, wherein the processor is arranged to scan each of the tiles along a selected scan line in a first scan direction so as to locate a first sequence of pixels on the line having pixel values within a predetermined range, and starting from each of at least some of the pixels in the first sequence, to scan in a second scan direction, transverse to the first scan direction, to both sides of the scan line, so as to reach endpoint pixels defined by the first of the pixels on both sides of the line having pixel values outside the predetermined range, and to join the endpoint pixels on each side of the line so as to define respective edges of a first one of the stripes.

16. Apparatus according to claim 15, wherein the processor is arranged to repeat the steps of scanning the area in the first and second scan directions and of joining the endpoint pixels for at least a second sequence of the pixels on the line having pixel values within the predetermined range, so as to define the respective edges of at least a second one of the stripes, and to compare the edges of at least the first and second stripes to find the stripe pattern in the image.

17. Apparatus for locating a barcode in an image, comprising an image processor, which is arranged to divide the image into a plurality of tiles, to scan each of the tiles so as to detect a pattern of stripes associated with the barcode in at least one of the tiles, to analyze the pattern of stripes so as to determine an angle of orientation of the barcode, and responsive to the determined angle, to define bounds of the barcode that are aligned with the pattern of the stripes, wherein upon detecting the pattern of stripes in a first one of the tiles, the processor is arranged to seek the bounds of the barcode in at least a second one of the tiles, adjacent to the first one of the tiles.

18. Apparatus according to claim 17, wherein the processor is arranged to detect the pattern of stripes substantially irrespective of the angle of orientation of the stripes.

19. Apparatus according to claim 17, wherein the stripes have respective ends, and wherein the processor is arranged to locate the ends of the stripes and to delimit a rectangle containing the barcode and having sides defined by the ends of the stripes.

20. Apparatus according to claim 17, and comprising an image capture device, which is arranged to capture the image of an object on which the barcode appears.

21. Apparatus according to claim 20, wherein the image processor is arranged to read the barcode responsive to the bounds so as to extract information contained in the barcode, and comprising a sorter, which is arranged to sort the object responsive to the information.

22. Apparatus for locating a barcode in an image, comprising an image processor, which is arranged to divide the image into a plurality of tiles, to scan each of the tiles so as to detect a pattern of stripes associated with the barcode in at least one of the tiles, to analyze the pattern of stripes so as to determine an angle of orientation of the barcode, and responsive to the determined angle, to define bounds of the barcode that are aligned with the pattern of the stripes, wherein the stripes have respective ends, and wherein the processor is arranged to locate the ends of the stripes and to delimit a rectangle containing the barcode and having sides defined by the ends of the stripes, and wherein the processor is arranged to find extreme lines of the barcode corresponding to first and last ones of the stripes of the barcode, and to scan along at least some of the stripes intermediate the first and last stripes in a direction parallel to the extreme lines in order to locate the ends of the stripes.

23. Apparatus for finding a pattern of parallel stripes in an image, which comprises a plurality of pixels having respective pixel values, the apparatus comprising an image processor, which is arranged to scan an area of the image along a selected scan line in a first scan direction so as to locate a first sequence of the pixels on the line having pixel values within a predetermined range, and starting from each of at least some of the pixels in the sequence, to scan in a second scan direction, transverse to the first scan direction, to both sides of the line, so as to reach endpoint pixels defined by the first of the pixels on both sides of the line having pixel values outside the predetermined range, to join the endpoint pixels on each side of the line to define respective edges of a first one of the stripes, and to repeat the steps of scanning the area in the first and second scan directions and of joining the endpoint pixels for at least a second sequence of the pixels on the line having pixel values within the predetermined range, so as to define the respective edges of at least a second one of the stripes, and to compare the edges of at least the first and second stripes to find the stripe pattern in the image.

24. Apparatus according to claim 23, wherein the processor is arranged to scan the area along a further scan line, in a direction diagonal to the first scan direction, so as to locate third and fourth sequences of the pixels on the further scan line having pixel values within the predetermined range, and to repeat the steps of scanning in the second direction, joining the endpoint pixels and comparing the edges with respect to the third and fourth sequences of the pixels and the diagonal direction.

25. Apparatus according to claim 23, wherein the processor is arranged to determine an orientation of the stripes in the pattern by comparing the edges of the stripes.

26. Apparatus according to claim 25, wherein the processor is arranged to identify the stripes as belonging to the stripe pattern only if the edges are mutually parallel to within a predetermined limit.

27. Apparatus according to claim 23, wherein the pattern comprises a barcode.

28. A computer software product for locating a barcode in an image, comprising a computer-readable medium in which program instructions are stored, which instructions, when read by a computer, cause the computer to divide the image into a plurality of tiles, to scan each of the tiles so as to detect a pattern of stripes associated with the barcode in at least one of the tiles, to analyze the pattern of stripes so as to determine an angle of orientation of the barcode, and responsive to the determined angle, to define bounds of the barcode that are aligned with the pattern of the stripes, wherein the instructions cause the computer to scan the tiles so as to detect the pattern of stripes substantially irrespective of the angle of orientation of the barcode, and wherein the instructions cause the computer to scan each of the tiles on a first line through the tile in a first scan direction so as to detect the stripes in the tile that are crossed by the first line, and to scan on a second line through the tile in a second scan direction, at a diagonal to the first direction, so as to detect the stripes in the tile that are crossed by the second line.

29. A computer software product for locating a barcode in an image, comprising a computer-readable medium in which program instructions are stored, which instructions, when read by a computer, cause the computer to divide the image into a plurality of tiles, to scan each of the tiles so as to detect a pattern of stripes associated with the barcode in at least one of the tiles, to analyze the pattern of stripes so as to determine an angle of orientation of the barcode, and responsive to the determined angle, to define bounds of the barcode that are aligned with the pattern of the stripes, wherein the instructions cause the computer to scan each of the tiles along a selected scan line in a first scan direction so as to locate a first sequence of pixels on the line having pixel values within a predetermined range, and starting from each of at least some of the pixels in the first sequence, to scan in a second scan direction, transverse to the first scan direction, to both sides of the scan line, so as to reach endpoint pixels defined by the first of the pixels on both sides of the line having pixel values outside the predetermined range, and to join the endpoint pixels on each side of the line so as to define respective edges of a first one of the stripes.

30. A product according to claim 29, wherein the instructions further cause the computer to repeat the steps of scanning the area in the first and second scan directions and of joining the endpoint pixels for at least a second sequence of the pixels on the line having pixel values within the predetermined range, so as to define the respective edges of at least a second one of the stripes, and to compare the edges of at least the first and second stripes to find the stripe pattern in the image.

31. A computer software product for locating a barcode in an image, comprising a computer-readable medium in which program instructions are stored, which instructions, when read by a computer, cause the computer to divide the image into a plurality of tiles, to scan each of the tiles so as to detect a pattern of stripes associated with the barcode in at least one of the tiles, to analyze the pattern of stripes so as to determine an angle of orientation of the barcode, and responsive to the determined angle, to define bounds of the barcode that are aligned with the pattern of the stripes, wherein the instructions cause the computer, upon detecting the pattern of stripes in a first one of the tiles, to seek the bounds of the barcode in at least a second one of the tiles, adjacent to the first one of the tiles.

32. A product according to claim 31, wherein the instructions cause the computer to scan the tiles so as to detect the pattern of stripes substantially irrespective of the angle of orientation of the stripes.

33. A product according to claim 31, wherein the stripes have respective ends, and wherein the instructions cause the computer to find the ends of the stripes and to delimit a rectangle containing the barcode and having sides defined by the ends of the stripes.

34. A computer software product for locating a barcode in an image, comprising a computer-readable medium in which program instructions are stored, which instructions, when read by a computer, cause the computer to divide the image into a plurality of tiles, to scan each of the tiles so as to detect a pattern of stripes associated with the barcode in at least one of the tiles, to analyze the pattern of stripes so as to determine an angle of orientation of the barcode, and responsive to the determined angle, to define bounds of the barcode that are aligned with the pattern of the stripes, wherein the stripes have respective ends, and wherein the instructions cause the computer to find the ends of the stripes and to delimit a rectangle containing the barcode and having sides defined by the ends of the stripes, and wherein the instructions cause the computer to find extreme lines of the barcode corresponding to first and last ones of the stripes of the barcode, and to locate the ends of the stripes by scanning along at least some of the stripes intermediate the first and last stripes in a direction parallel to the extreme lines.

35. A computer software product for finding a pattern of parallel stripes in an image, which comprises a plurality of pixels having respective pixel values, the product comprising a computer-readable medium in which program instructions are stored, which instructions, when read by a computer, cause the computer to scan an area of the image along a selected scan line in a first scan direction so as to locate a first sequence of the pixels on the line having pixel values within a predetermined range, and starting from each of at least some of the pixels in the sequence, to scan in a second scan direction, transverse to the first scan direction, to both sides of the line, so as to reach endpoint pixels defined by the first of the pixels on both sides of the line having pixel values outside the predetermined range, to join the endpoint pixels on each aide of the line to define respective edges of a first one of the stripes, and to repeat the steps of scanning the area in the first and second scan directions and of joining the endpoint pixels for at least a second sequence of the pixels on the line having pixel values within the predetermined range, so as to define the respective edges of at least a second one of the stripes, and to compare the edges of at least the first and second stripes to find the stripe pattern in the image.

36. A product according to claim 35, wherein the instructions cause the computer to scan the area along a further scan line, in a direction diagonal to the first scan direction, so as to locate third and fourth sequences of the pixels on the further scan line having pixel values within the predetermined range, and to repeat the steps of scanning in the second direction, joining the endpoint pixels and comparing the edges with respect to the third and fourth sequences of the pixels and the diagonal direction.

37. A product according to claim 35, wherein the instructions cause the computer to determine an orientation of the stripes in the pattern responsive to the edges.

38. A product according to claim 37, wherein the instructions cause the computer to identify the stripes as belonging to the stripe pattern only if the edges are mutually parallel to within a predetermined limit.

39. A product according to claim 35, wherein the pattern comprises a barcode.

* * * * *